United States Patent
Wu et al.

(10) Patent No.: US 9,051,871 B1
(45) Date of Patent: Jun. 9, 2015

(54) VARIABLE TWIN-SCROLL TURBINE FOR TURBOCHARGED INTERNAL COMBUSTION ENGINE FEATURING CYLINDER DEACTIVATION

(71) Applicant: GM Global Technology Operations LLC, Detroit, MI (US)

(72) Inventors: Ko-Jen Wu, Troy, MI (US); Jason C. Melecosky, Oxford, MI (US); Darrel J. Walter, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/192,408

(22) Filed: Feb. 27, 2014

(51) Int. Cl.
  *F02D 23/00* (2006.01)
  *F02B 33/44* (2006.01)
  *F02B 37/22* (2006.01)

(52) U.S. Cl.
  CPC ..................... *F02B 37/22* (2013.01)

(58) Field of Classification Search
  USPC ................................. 60/602, 605.2
  See application file for complete search history.

(56) References Cited

U.S. PATENT DOCUMENTS

| 6,715,289 | B2 | 4/2004 | Mader et al. |
| 6,786,190 | B2 | 9/2004 | Wu et al. |
| 2014/0352300 | A1* | 12/2014 | Keating .................... 60/612 |
| 2014/0360185 | A1* | 12/2014 | Boyer et al. .............. 60/602 |

OTHER PUBLICATIONS

Active Fuel Management Technology: Hardware Development on a 2007 GV 3.9L V-6 OHV SI Engine, SAE Paper 2007-01-1292, 2007.
The 1.4-L TSI Gasoline Engine with Cylinder Deactivation, MTZ, vol. 73, Mar. 2012.

* cited by examiner

*Primary Examiner* — Kenneth Bomberg
*Assistant Examiner* — Dapinder Singh
(74) *Attorney, Agent, or Firm* — Harness, Dickey & Pierce, P.L.C.

(57) ABSTRACT

An internal combustion engine defines a plurality of cylinders including full-time active cylinders and cylinders capable of being deactivated. A turbocharger having a twin scroll turbine includes a first turbine scroll in communication with the exhaust passages from the full-time active cylinders and a second turbine scroll in communication with the exhaust passages from the cylinders capable of being deactivated. A scroll control valve is provided in communication with the exhaust passages from the cylinders capable of being deactivated and being operable in an open position to allow exhaust gases from the cylinders capable of being deactivated to pass through the second turbine scroll, and being operable in a closed position to direct exhaust gases from the plurality of second cylinders capable of being deactivated to pass through the first turbine scroll.

10 Claims, 3 Drawing Sheets

US 9,051,871 B1

VARIABLE TWIN-SCROLL TURBINE FOR TURBOCHARGED INTERNAL COMBUSTION ENGINE FEATURING CYLINDER DEACTIVATION

FIELD

The present disclosure relates to a variable twin-scroll turbine for turbocharged internal combustion engines featuring cylinder deactivation.

BACKGROUND

This section provides background information related to the present disclosure which is not necessarily prior art.

Present regulatory conditions in the automotive market have led to an increasing demand to improve fuel economy and reduce emissions in present vehicles. These regulatory conditions must be balanced with the demands of a consumer for high-performance and quick response for a vehicle. Cylinder deactivation is a technology that often is applied to naturally aspirated internal combustion engines to improve the engine's efficiencies under part-load conditions by switching off a selected number of cylinders so the remaining cylinders would operate with reduced pumping losses [see "Active Fuel Management Technology: Hardware Development on a 2007 GM 3.9 L V-6 OHV SI Engine," SAE Paper 2007-01-1292, 2007].

Cylinder deactivation can be applied to turbocharged engines as disclosed in U.S. Pat. Nos. 6,715,289 and 6,786,190. However, when an engine is equipped with a single turbocharger, the operating ranges of the engine in the deactivated mode can be limited by the turbocharger compressor's flow and boost pressure capabilities [see "The 1.4-L TSI Gasoline Engine with Cylinder Deactivation," MTZ, volume 73, March 2012].

One way to alleviate such limitation is to use multiple separate turbochargers, such as disclosed in the above-mentioned U.S. Pat. No. 6,715,289, so their operations can fulfill the requirements of the engine over its speed and load ranges. Nevertheless, there is a desire to use a single turbocharger for the reasons of system simplicity, packaging complexity and cost containment, even with compromises of the turbocharger's efficiency.

It is possible to size a turbocharger compressor to favor the deactivated operation of the engine, primarily at lower engine speeds. This would require the use of a smaller compressor, by compromising the engine's performance at high engine speeds. The compressor can be at a size such that a single fixed geometry turbine is not capable of driving the compressor to meet performance requirements. As anticipated, a smaller turbine is desired to meet the low engine speed target while a larger turbine is desired to meet the high engine speed target.

SUMMARY

This section provides a general summary of the disclosure, and is not a comprehensive disclosure of its full scope or all of its features.

An internal combustion engine includes an engine defining a plurality of cylinders including full-time active cylinders and cylinders capable of being deactivated. A turbocharger having a twin scroll turbine includes a first turbine scroll in communication with the exhaust passages from the full-time active cylinders and a second turbine scroll in communication with the exhaust passages from the cylinders capable of being deactivated. The turbocharger includes a single compressor driven by the twin-scroll turbine for supplying compressed air to the intake ports of the cylinders. A scroll control valve is provided in communication with the exhaust passages from the cylinders capable of being deactivated and being operable in an open position to allow exhaust gases from the cylinders capable of being deactivated to pass through the second turbine scroll, and being operable in a closed position to direct exhaust gases from the plurality of second cylinders capable of being deactivated to pass through the first turbine scroll.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
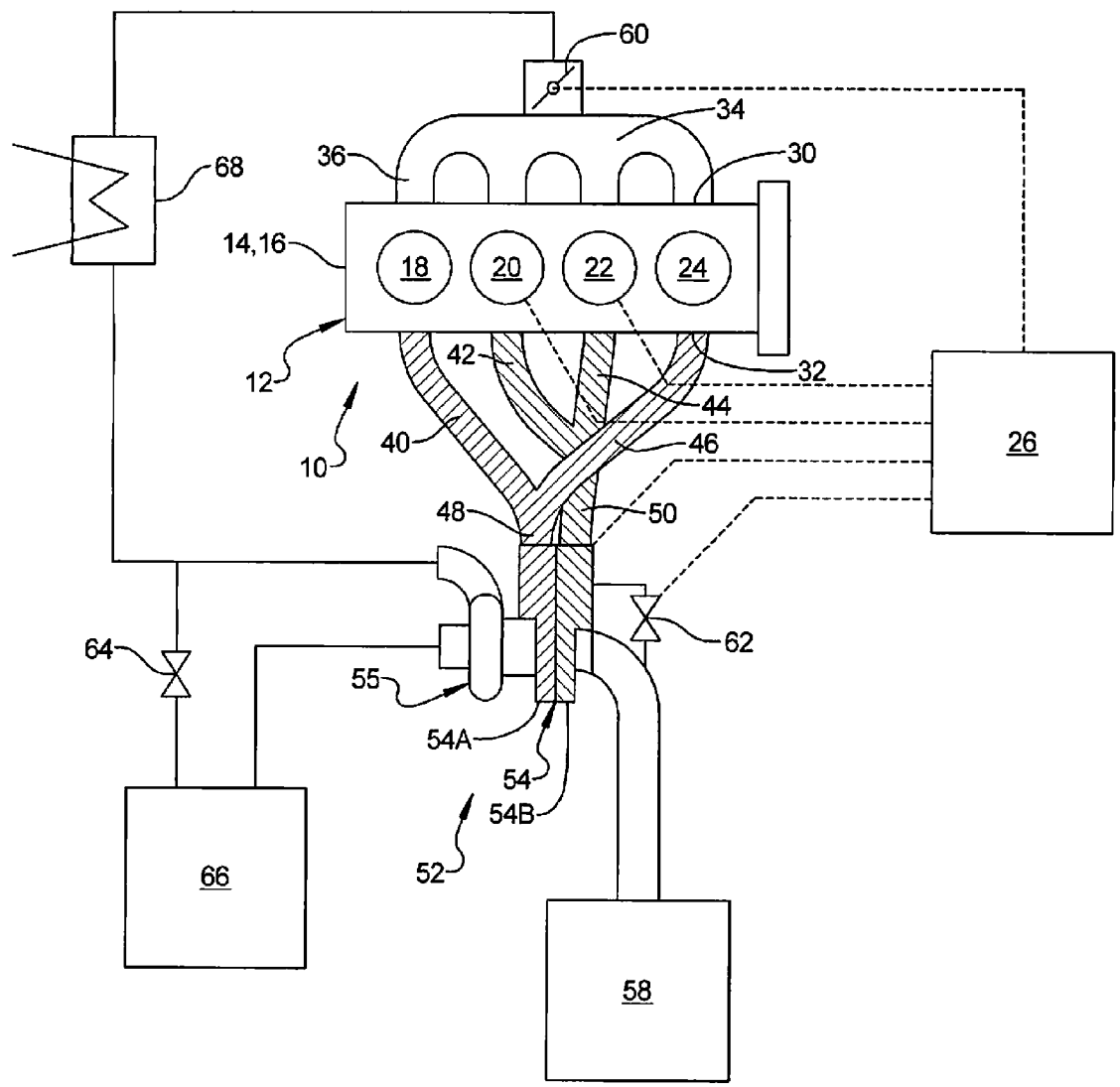
FIG. 1 is a schematic view of a variable twin-scroll turbine turbocharger system on an engine featuring cylinder deactivation.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An engine assembly 10 is illustrated in FIG. 1 and includes an engine structure 12. The engine structure 12 may include an engine block 14 and a cylinder head 16. The engine structure 12 may define first, second, third and fourth cylinders 18, 20, 22, 24. The description includes first, second, third and fourth cylinders 18, 20, 22, 24 for simplicity and it is understood that the present teachings apply to any number of piston-cylinder arrangements and a variety of reciprocating engine configurations including, but not limited to, V-engines, in-line engines, and horizontally opposed engines, as well as both overhead cam and cam-in-block configurations. The engine structure supports a crankshaft and a plurality of pistons that are disposed in the respective cylinders 18, 20, 22, 24 as is known in the art.

The engine 10 features cylinder deactivation such that, by way of example, a controller 26 can deactivate one or more of the cylinders 18, 20, 22, 24. In the example shown, cylinders 20 and 22 can be deactivated by the controller 26. The cylinder deactivation occurs as a function of load or torque demand by the vehicle as determined by variables such as manifold pressure. If the internal combustion engine is in a condition where it can deliver the desired torque with partial displacement to improve efficiency, the controller 26 will deactivate the mechanisms operating the valves for the selected cylinders and also shut off fuel and spark to the selected cylinders. The deactivated cylinders will then function as air springs.

The engine structure 12 may define a plurality of intake ports 30 (only one is labeled) and a plurality of exhaust ports 32 (only one is labeled) in the cylinder head 16 associated with each of the cylinders 18, 20, 22 and 24.

Engine assembly 10 includes an intake manifold 34 having a plurality of runners 36 (only one is labeled) in communication with each of the intake ports 30. A plurality of exhaust runners 40, 42, 44, 46 are in communication with each of the exhaust ports 32. The exhaust runners are bifurcated so that the exhaust runners 40 and 46 from the full-time active cylinders 18, 24 are connected to each other at first exhaust passage 48 and the exhaust runners 42 and 44, from the cylinders 20, 22 that can be deactivated, are connected to each other at second exhaust passage 50.

A turbocharger 52 includes a variable twin-scroll turbine 54 including two turbine scrolls 54A and 54B. The first turbine scroll 54A receives exhaust gases from the first exhaust passage 48 and the second turbine scroll 54B receives exhaust gasses from the second exhaust passage 50. Each of the first and second turbine scrolls 54A, 54B can feed exhaust gasses from the first and second exhaust passages 48, 50 to the turbine (not shown) which is connected to a shaft that drives a compressor 55. The exhaust gasses pass through the twin scroll turbine 54 and through an exhaust system 58. The compressor 55 is in communication with an intake system 66 and provides compressed air to the intake manifold 34. A scroll control valve 56 is controlled by the controller 26 for selectively blocking off exhaust gases from the second exhaust passage 50 to the second turbine scroll 54B and re-directs the exhaust gases to the first turbine scroll 54A.

Figure 4:
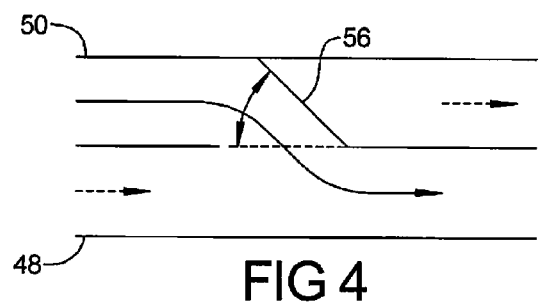
FIG. 4 is a schematic diagram of a scroll control valve according to the principles of the present disclosure.

FIG. 4 shows a schematic view of an exemplary scroll control valve 56 that can be open to allow flow from the second exhaust passage 50 to the second turbine scroll 54B, or closed (as shown) to direct exhaust flow from the second exhaust passage 50 to the first turbine scroll 54A. The scroll control valve can be activated by known means such as an electrical servo motor or other pneumatic or hydraulic actuator. The controller 26 coordinates the operation of the scroll control valve 56 and engine deactivation along with any necessary sensors. In addition, the controller 26 controls a throttle body 60 and a waste gate valve 62 which regulate the engine's load by regulating the inlet flow rate. As shown in FIG. 1, a bypass valve 64 can be provided in communication with the intake system 66 to bypass the turbocharger 54. In addition, a heat exchanger 68 can be provided to cool the intake air upstream of the throttle body 60.

Figure 2:
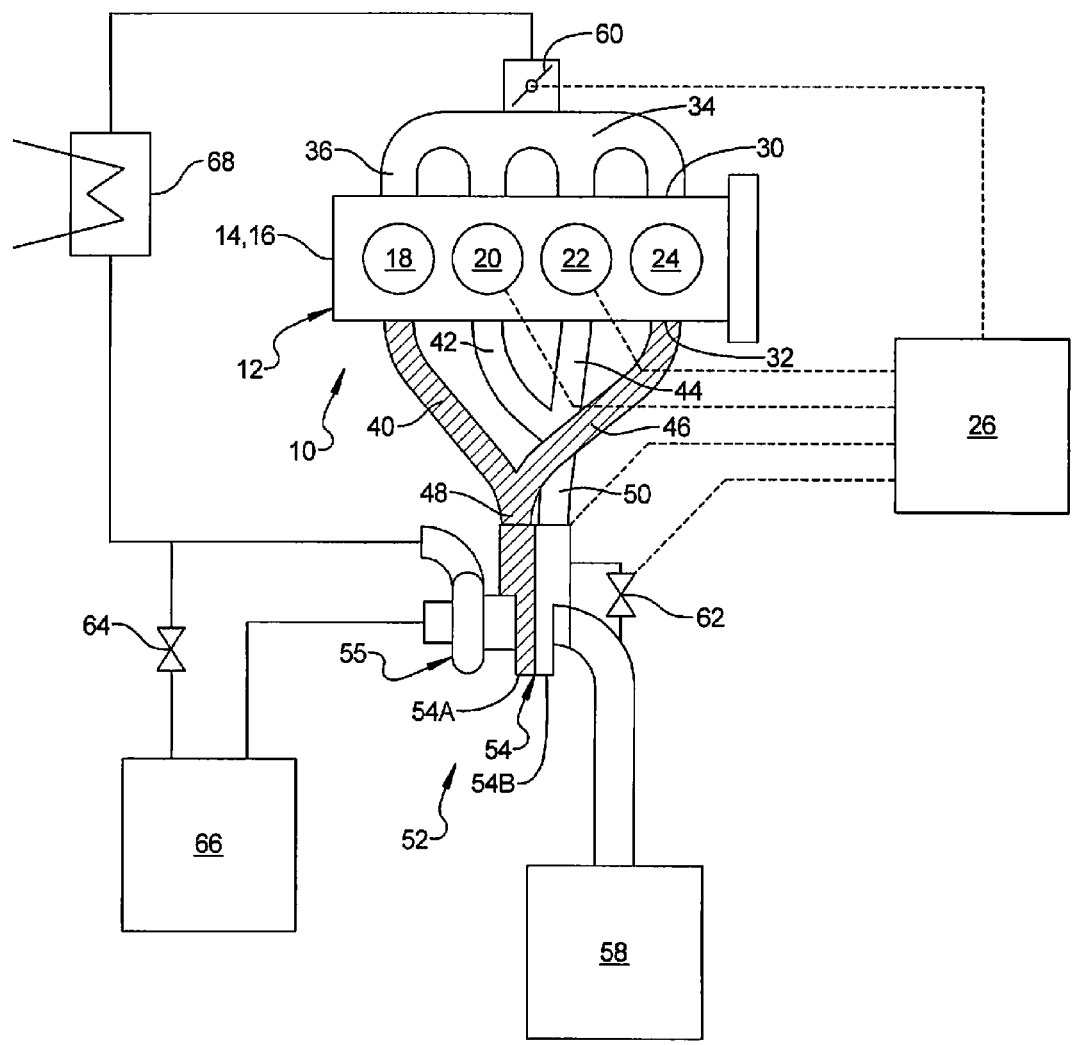
FIG. 2 is a schematic view of the variable twin-scroll turbine turbocharger system on an engine featuring cylinder deactivation as shown in FIG. 1, with cylinders deactivated for operation at low speed and under low load.
Figure 3:
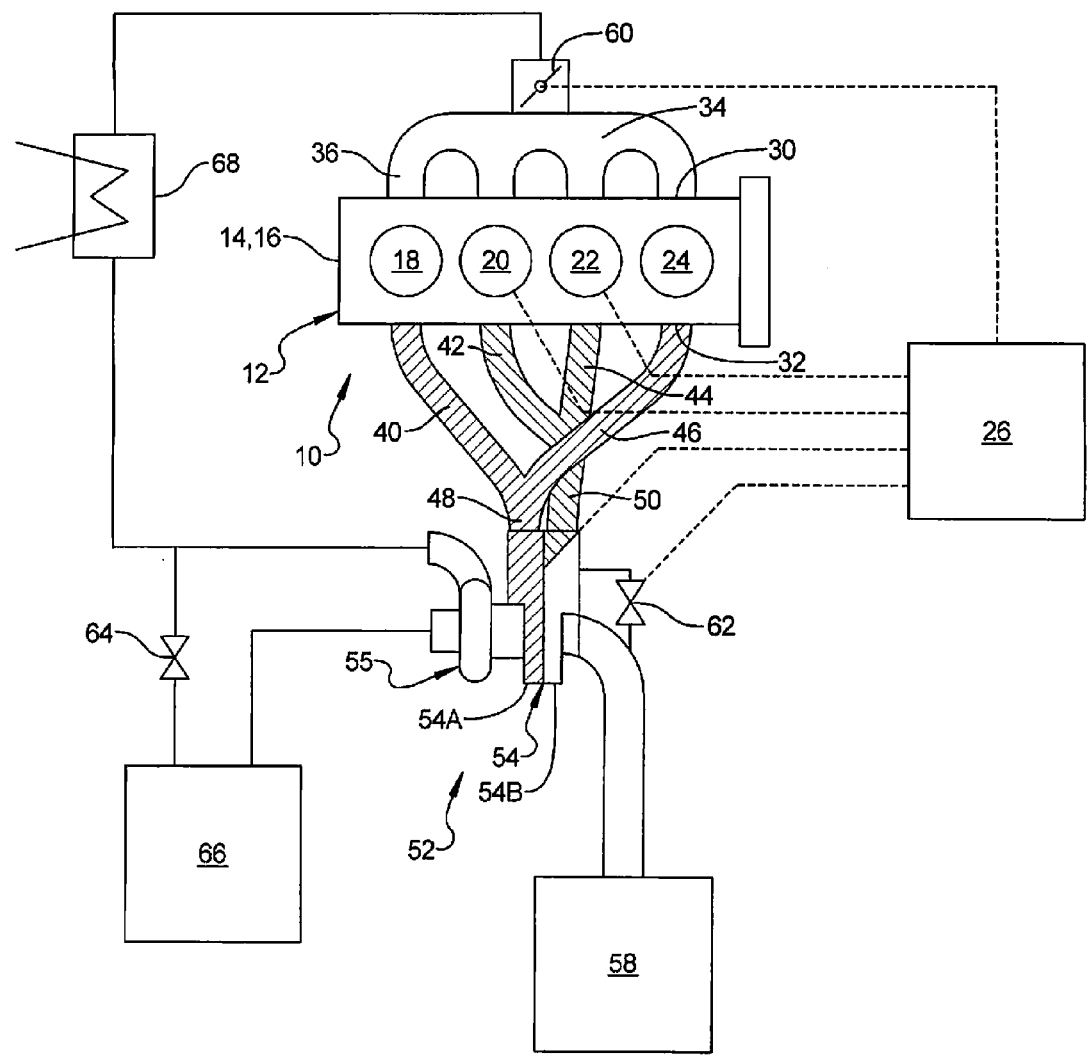
FIG. 3 is a schematic of a variable twin-scroll turbine turbocharger system on an engine featuring cylinder deactivation as shown in FIG. 1, with all cylinders operable and the exhaust routed to one turbine scroll for operation at low speeds and under high loads.

In operation, FIG. 1 is illustrative of the operable mode at high speeds (above a predetermined speed) where the flow rates when boosted are high and all cylinders are active and the scroll control valve 56 is open to utilize the full turbine capacity. In FIGS. 1-3, the operable portions of the engine 10 are shaded for illustrative purposes. FIG. 2 is illustrative of the operable mode at low speeds (below a predetermined speed) and low loads with some cylinders (20, 22) being deactivated and the scroll control valve 56 can be opened while no exhaust is generated from the deactivated cylinders 20 and 22 so that exhaust flow from the cylinders 18 and 24 is in one turbine scroll 54A. FIG. 3 is illustrative of the operable mode at low speeds and high loads (below a predetermined speed and yet above a predetermined load level) where all cylinders are active and the scroll control valve is closed to channel all of the exhaust flow into one turbine scroll 54A.

The present disclosure provides improved turbocharger response at low engine speeds as well as extended operating range of the engine 10 with cylinders deactivated and thus better fuel economy. The system provides improved overall full-load performance which can lead to better fuel economy.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine, comprising:
   an engine block defining a plurality of cylinders, the plurality of cylinders including at least one full-time active cylinder and at least one cylinder capable of being deactivated;
   a cylinder head attached to the engine block and including a plurality of intake ports and a plurality of exhaust ports in communication with the plurality of cylinders;
   an intake manifold in communication with the plurality of intake ports;
   a plurality of exhaust passages connected to the plurality of exhaust ports;
   a turbocharger having a twin scroll turbine including a first turbine scroll in communication with the exhaust passages from the at least one full-time active cylinder and a second turbine scroll in communication with the exhaust passages from the at least one cylinder capable of being deactivated, the turbocharger including a compressor driven by the twin scroll turbine for supplying compressed air to the throttle body; and
   a scroll control valve provided in communication with the exhaust passages from the at least one cylinder capable of being deactivated and being operable in an open position to allow exhaust gases from the at least one cylinder capable of being deactivated to pass through the second turbine scroll, and being operable in a closed position to direct exhaust gases from the at least one cylinder capable of being deactivated to pass through the first turbine scroll.

2. The internal combustion engine according to claim 1, further comprising a control unit for controlling operation of the scroll control valve and for controlling the activation or deactivation of the at least one cylinder capable of being deactivated.

3. The internal combustion engine according to claim 2, further comprising a throttle body disposed upstream of the intake manifold, wherein said control unit controls operation of the throttle valve.

4. The internal combustion engine according to claim 2, wherein during operation of the engine with all of the plurality of cylinders activated and above a predetermined speed, the control unit maintains the scroll control valve in the open position, and during operation of the engine with all of the plurality of cylinders activated and below the predetermined speed, the control unit maintains the scroll control valve in the closed position.

5. The internal combustion engine according to claim 2, wherein during operation of the engine below a predetermined speed and below a predetermined load, the control unit deactivates the at least one cylinder capable of being deactivated and maintains the scroll control valve in the open position.

6. An internal combustion engine, comprising:
   an engine block defining a plurality of cylinders, the plurality of cylinders including a plurality of first full-time active cylinders and a plurality of second cylinders capable of being deactivated;
   a cylinder head attached to the engine block and including a plurality of intake ports and a plurality of exhaust ports in communication with the plurality of cylinders;
   an intake manifold in communication with the plurality of intake ports;
   a plurality of exhaust passages connected to the plurality of exhaust ports;
   a turbocharger having a twin scroll turbine including a first turbine scroll in communication with the exhaust passages from the plurality of first full-time active cylinders and a second turbine scroll in communication with the exhaust passages from the plurality of second cylinders capable of being deactivated, the turbocharger including a compressor driven by the twin scroll turbine for supplying compressed air to the throttle body; and
   a scroll control valve provided in communication with the exhaust passages from the plurality of second cylinders capable of being deactivated and being operable in an open position to allow exhaust gases from the plurality of second cylinders capable of being deactivated to pass through the second turbine scroll, and being operable in a closed position to direct exhaust gases from the plurality of second cylinders capable of being deactivated to pass through the first turbine scroll.

7. The internal combustion engine according to claim 6, further comprising a control unit for controlling operation of the scroll control valve and for controlling the activation or deactivation of the plurality of second cylinders capable of being deactivated.

8. The internal combustion engine according to claim 7, further comprising a throttle body disposed upstream of the intake manifold, wherein said control unit controls operation of the throttle valve.

9. The internal combustion engine according to claim 7, wherein during operation of the engine with all of the plurality of cylinders activated and above a predetermined speed, the control unit maintains the scroll control valve in the open position, and during operation of the engine with all of the plurality of cylinders activated and below the predetermined speed, the control unit maintains the scroll control valve in the closed position.

10. The internal combustion engine according to claim 7, wherein during operation of the engine below a predetermined speed and below a predetermined load, the control unit deactivates the plurality of second cylinders capable of being deactivated and maintains the scroll control valve in the open position.

* * * * *